United States Patent [19]

Druelle et al.

[11] Patent Number: 4,821,545

[45] Date of Patent: Apr. 18, 1989

[54] INSTALLATION FOR THE DETENSIONING OF EXPANDED TUBES, PARTICULARLY IN A HEAT EXCHANGER

[75] Inventors: Philippe Druelle, Gournay Sur Marne; Pierre Vidal, Montigny Sur Loing; Robert Saglio, Antony; Jean-Louis Tocci, Paris, all of France

[73] Assignees: Intercontrole S. A.; Electricite De France Service, both of Paris, France

[21] Appl. No.: 55,454

[22] Filed: May 28, 1987

[51] Int. Cl.$^4$ .............................................. B21D 7/06
[52] U.S. Cl. .......................................... 72/53; 51/334; 51/332; 29/90.7
[58] Field of Search ...................... 72/53, 40, 466, 110, 72/199, 234, 362, 365; 29/904; 51/332, 334, 241 B, 241 S, 411, 337, 401, 402, 294, 298

[56] References Cited

U.S. PATENT DOCUMENTS

| | | | |
|---|---|---|---|
| 3,648,498 | 3/1972 | Voss et al. | 72/53 |
| 4,616,496 | 10/1986 | Hawkins | 72/53 |
| 4,616,497 | 10/1986 | Harman et al. | 72/53 |
| 4,713,952 | 12/1987 | Senger et al. | 29/90 A |

FOREIGN PATENT DOCUMENTS

| | | |
|---|---|---|
| 0082519 | 6/1983 | European Pat. Off. . |
| 1477915 | 5/1969 | Fed. Rep. of Germany . |
| 2246942 | 4/1974 | Fed. Rep. of Germany . |
| 2511913 | 3/1983 | France . |
| 2104821 | 3/1983 | United Kingdom . |
| 2159085 | 5/1984 | United Kingdom . |

Primary Examiner—David Jones
Attorney, Agent, or Firm—Pearne, Gordon, McCoy & Granger

[57] ABSTRACT

Detensioning of expanded tubes is brought by way of an installation using a rotopeening method. The tool is constituted by a cage moved along a helical path centered on the axis of the tube to be treated. The cage supports in rotary manner a shaft, whose axis is parallel and offcentered with respect to that of the cage. The shaft carries flexible plates, called brushes, whose ends are equipped with shot able to peen the inner wall of the tube during the rotation of the shaft. The helical path ensures a regular distribution of the impacts and consequently a uniform treatment of the surface.

13 Claims, 8 Drawing Sheets

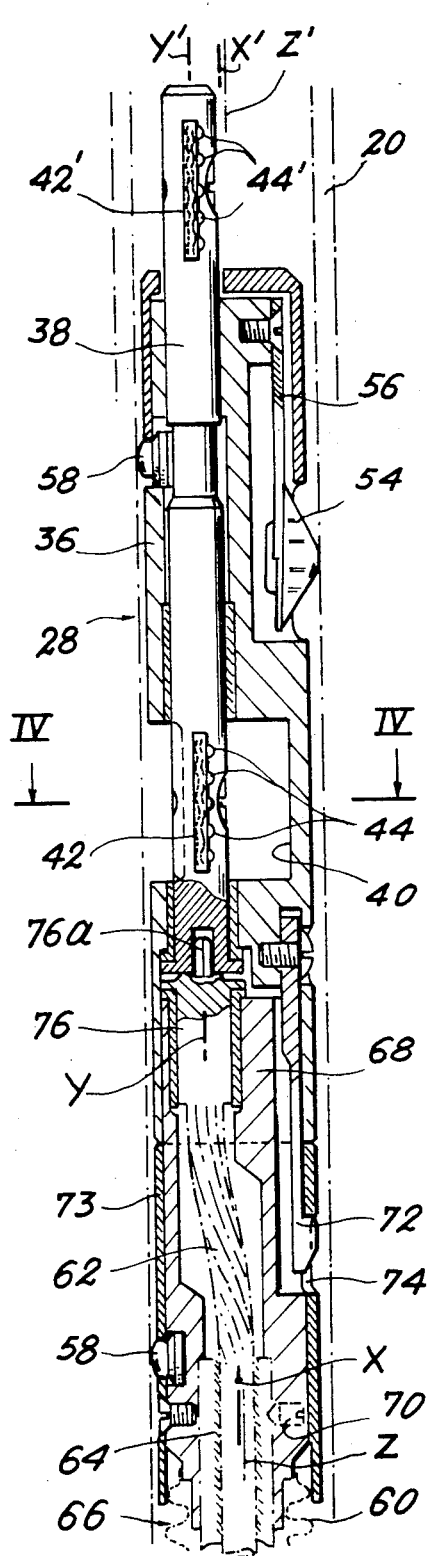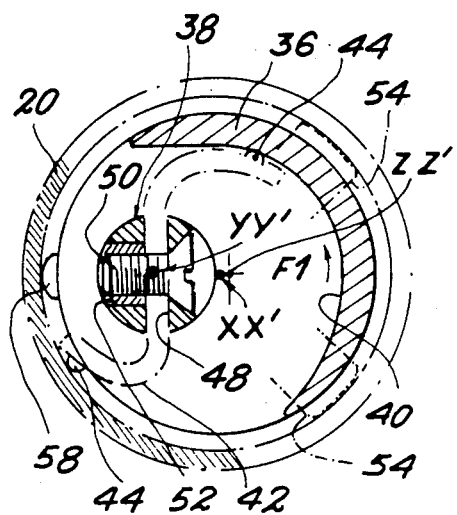
FIG. 4
FIG. 3

INSTALLATION FOR THE DETENSIONING OF EXPANDED TUBES, PARTICULARLY IN A HEAT EXCHANGER

BACKGROUND OF THE INVENTION

The present invention relates to an installation designed for reabsorbing the mechanical tensions induced in a tube by an expansion operation. Such an installation is particularly suitable for the detensioning of the ends of heat exchanger tubes and more especially steam generators, particularly when these equipments are used in a nuclear reactor. However, it is not limited to such an application.

In heat exchangers, the heat exchange between the two fluids generally takes place through a group of long tubes, in which one of the fluids circulate, whereas the other fluid circulates around the tubes. At their ends, the tubes are tightly fixed to a thick plate, called a "tube plate". Usually this tight fixing is obtained on the one hand by welding the tube end to the outer face of the plate and on the other by the expansion of the tube over at least part of the thickness of the tube plate, said part generally being located in the vicinity of the inner face of the plate.

The expansion of the tubes in the tube plate leads to mechanical stresses in the tubes generally located in the vicinity of the inner skin of said tubes. In certain cases, these mechanical stresses have no effect on the operation of the exchanger and are consequently admissible. However, when the fluids circulating in the exchanger are corrosive, as is more particularly the case in nuclear reactors, these stresses lead to the production of microcracks, which can sometimes completely traverse the tube, which consequently becomes unusable and has to be sealed. This makes it necessary to carry out checking operations, followed by operations for sealing the tubes on a relatively frequent basis. Moreover, the sealing of a large number of tubes of a heat exchanger leads to a reduction in its efficiency by the same proportion.

It is therefore desirable to have an installation making it possible to reabsorb the stresses induced in tubes during expansion.

A first known method for carrying out the detensioning of expanded tubes is shotpeening developed by FRAMATOME. This method consists of introducing into the expanded part of the tube an injection head by which Inconel shot is loosely blasted against the inner wall of the tube by means of compressed air. The resulting peening reabsorbs the internal skin stresses.

This shotpeening method is particularly effective when the conditions under which it is applied are satisfactory. However, the maintaining of this effectiveness makes it necessary to very strictly control the temperature and inject the shot in the absence of any humidity. Moreover, when this method is used on a heat exchanger equipping an operating nuclear reactor, the shot used for the detensioning of the tubes are contaminated. Bearing in mind the number of tubes generally equipping a heat exchanger, a large volume of waste requiring subsequent treatment is consequently produced. The cost of this method is therefore greatly increased.

Another known method for detensioning expanded tubes is rotopeening developed by WESTINGHOUSE. According to this method, described in FR-A-No. 2 511913, the detensioning of the expanded tubes is carried out by successively introducing into each of the tubes a tool ensuring the peening of the inner wall of the tube. This tool is formed from flexible plates (generally called brushes) mounted on a rotary shaft and carrying tungsten carbide shot at the ends thereof. The rotary shaft is eccentrically supported by a cylindrical cage centered by bearings within the tube to be treated. At each of the brushes, the cage has an open window in its part closest to the shaft. Thus, the rotation of the latter brings about the peening of the tube parts facing said windows by the shot carried by the brushes. In order that peening takes place over the entire tube circumference, the cage is also relatively slowly rotated about its own axis. Finally, the covering of the entire length of the expanded zone is obtained by imparting a reciprocating alternating movement to the cage parallel to its axis.

Compared with shotpeening, this rotopeening method has the essential advantage of not producing waste requiring special treatment and is also neither sensitive to temperature, nor humidity.

However, bearing in mind the superimposing of a rotary movement and an alternating reciprocating axial movement of the cage for circumferentially and longitudinally covering the expanded zone, the distribution of the impact of the shot on the inner wall of the tube is not uniform. This either makes the method partly ineffective, or leads to an excessively long operation to be satisfactory from the industrial standpoint.

The present invention constitutes an improvement to the rotopeening method, whose main objective is to ensure a regular distribution of the impact of the shot on the inner wall of the tubes, so that the minimum number of impacts necessary for obtaining a complete treatment of the surface is obtained in a sufficiently short time to be acceptable from the industrial standpoint.

SUMMARY OF THE INVENTION

The present invention therefore relates to an installation for the detensioning of expanded tubes comprising a tool constituted by a cylindrical cage having a given axis, a shaft mounted in rotary manner within said cage about a parallel axis and displaced with respect to the cage axis and at least one flexible plate fixed to said shaft facing an open window in part of the cage close to the shaft axis, said plate carrying at least one row of shot at its end, peening control means for rotating said shaft about its axis and sweeping control means for driving the cage in rotation and in translation within a tube to be treated and having an axis parallel to the axes of the cage and the shaft, wherein the sweeping control means move the cage along a helical path centered on the axis of the tube to be treated.

The displacement of the cage along a helical path makes it possible to ensure a helical uniform distribution of the impacts of the shot on the inner wall of the tubes. Thus, the peening of the complete expanded part is obtained with a minimum number of impacts and consequently in a relatively short time.

In a preferred embodiment of the invention, the sweeping control means are constituted by a threaded rod integral in rotation and translation with said cage, a nut mounted on a support member which can be immobilized relative to the tube, said nut being screwed onto the threaded rod and rotation control means for rotating the threaded rod. The pitch of the helical path or trajectory is then determined by the complimentary threads of the threaded rod and the nut.

According to a particularly interesting aspect of the invention, the installation also comprises means for displacing the helical path by approximately a half-pitch of said helix, depending on whether the translation of the cage along its axis takes place in one or other direction. Therefore, for each shot, the impacts formed along the return path of the tube are equidistant with respect to the impacts formed during the outward path. The maximum distance or span between all the impacts is consequently minimized in all cases, no matter what the variations between the real distance and the mean distance separating two adjacent shots.

In the preferred embodiment of the invention, the means for displacing the helical path by approximately a half-pitch of the helix comprise means for rotating the nut by approximately a half-turn in the support member during a rotation direction reversal of the rotation control means.

According to another interesting aspect of the invention, the pitch p of the helix is determined as a function of the mean distance m separating the shots in the same row, so that the impacts are not superimposed. To this end, the ratio p/m, expressed in percent, is chosen around the following values: 10, 22, 28, 37, 43, 56, 62, 71, 78 and 88. In the preferred embodiment, ratio p/m is given a value of approximately 56% corresponding to the best compromise between a high pitch (and therefore a relatively short treatment time) and a possibility of large fluctuations in the distances between the shots with respect to the mean value m.

In order to prevent the jamming of a shot accidentally detached from the plate which supports it, the diameter of the shot is preferably below the difference between the internal diameter of the tube and the external diameter of the cage.

Preferably, so as to ensure that the peening of the part of the tubes located immediately beyond the tube plate does not lead to mechanical stresses on the outer skin of the tubes at this point, the shaft has an extension beyond the end of the cage, said extension supporting a second flexible plate carrying shot at its end. The free nature of this plate reduces the force of the impacts at this level and consequently makes it possible to achieve the sought objective.

In order that the impacts of the shot on the inner wall of the tubes are independent of possible variations in the diameter of the tubes in the expanded part, the cage carries at least two elastic blocks able to bear within a tube in order to apply the cage generatrix closest to the shaft axis to the tube. The distance between the inner wall of the tubes and the rotation axis of the flexible plates is consequently retained, no matter what the diameter of the tubes.

When the installation according to the invention is adapted to the detensioning of tubes fixed in a tube plate, it preferably comprises a control subassembly which can be mounted on a supporting and positioning device and which carries peening control means and rotation control means, a toolholder subassembly which can be mounted on the supporting device, a flexible drive shaft connecting the peening control means to the tool shaft and a flexible drive sleeve surrounding the drive shaft and connecting the rotation control means to the cage and incorporating the threaded rod.

In a preferred embodiment of the invention, the toolholder subassembly carries means for introducing and extracting the tool, said means incorporating a driving pinion or gear, which meshes on an indented surface formed on said supporting member and on a flexible envelope placed around the flexible drive sheath between said support member and the tool cage.

Preferably, means are provided for dismantling the tool, e.g. between the cage and the flexible drive sleeve and between the drive shaft and the tool shaft.

Finally, the tool can also be formed from several modules, each comprising a cage element and a shaft element, the cage element and shaft elements of adjacent modules being connected by universal joints positioned one within the other.

BRIEF DESCRIPTION OF THE DRAWINGS

The invention is described in greater detail hereinafter relative to a non-limitative embodiment and the attached drawings, wherein show:

FIG. 3 a longitudinal sectional view showing on a larger scale the tool used in the installation of FIGS. 1 and 2.

FIG. 4 a sectional, larger scale view along line IV—IV of FIG. 3.

DETAILED DESCRIPTION OF THE INVENTION

Figure 1:
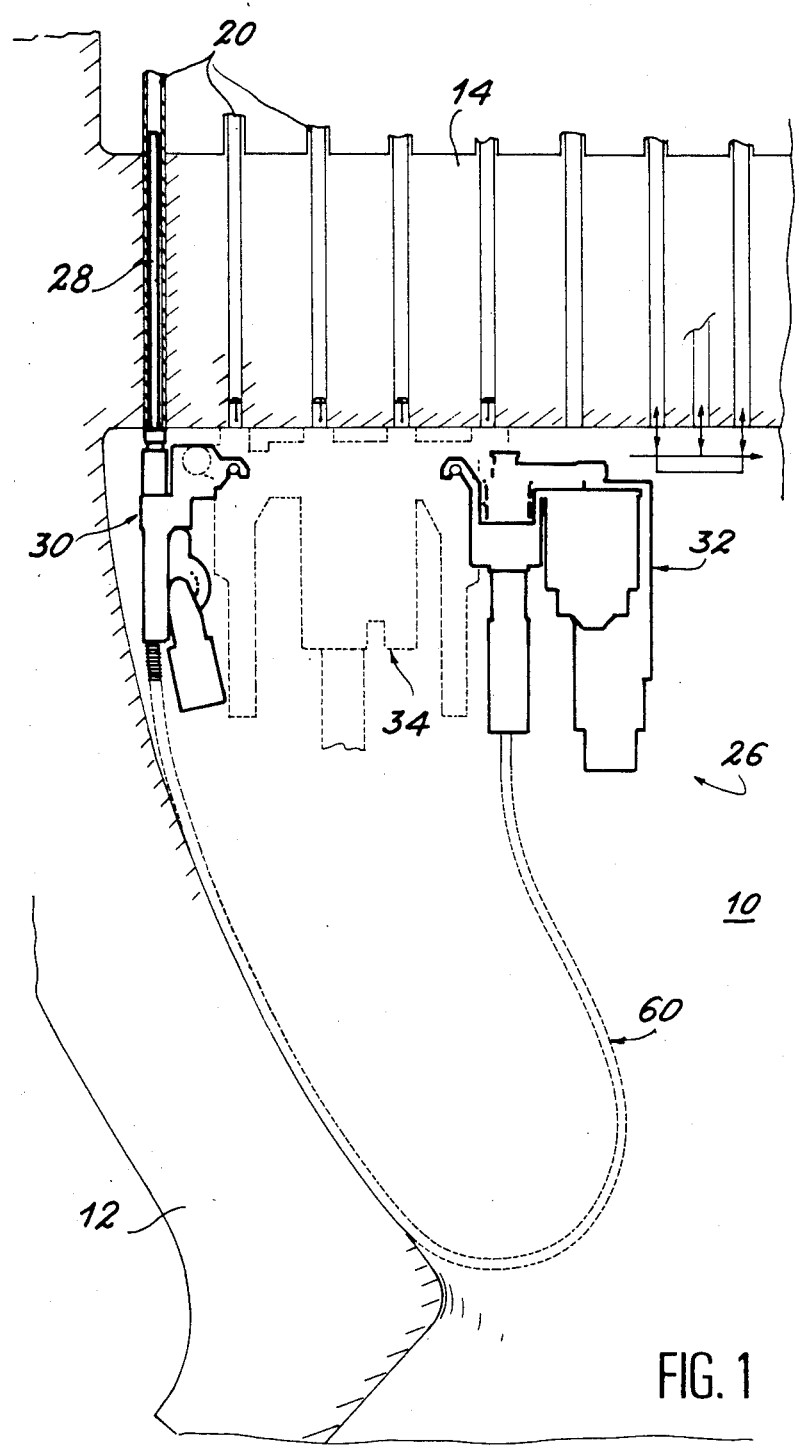
FIG. 1 a vertical sectional view diagrammatically showing part of the lower end of a heat exchanger and illustrating the detensioning of the ends of the tubes of said exchanger with the aid of an installation according to the invention.
Figure 2:
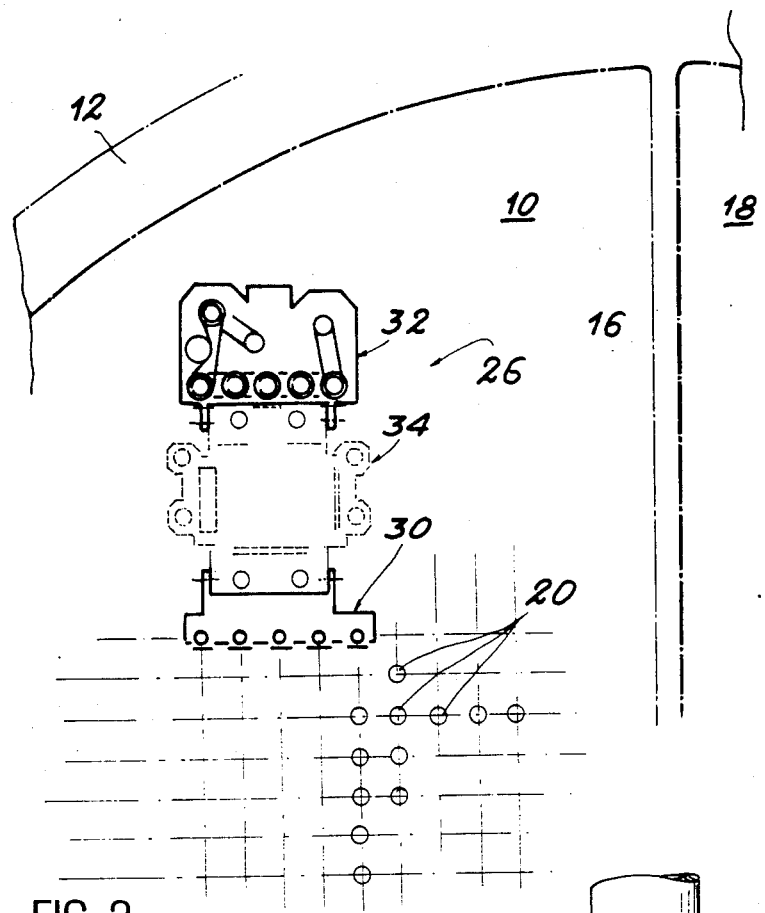
FIG. 2 a view from below diagrammatically showing the installation according to FIG. 1 during the operation of detensioning the exchanger tubes.

FIGS. 1 and 2 show part of the lower end of a steam generator ensuring the heat transfer between the water of the primary circuit and the water of the secondary circuit in a pressurized water nuclear reactor. This steam generator does not form part of the invention and will not consequently be described in detail.

For the better understanding of the invention, it is merely pointed out that the water of the primary circuit is admitted into the interior of the steam generator by a water intake chamber 10 formed between the hemispherical bottom 12 of the outer envelope of the exchanger, a horizontal tube plate 14 and a vertical partition 16 (FIG. 2) separating said intake chamber 10 from an outlet chamber 18 identical to chamber 10. The transfer of the water of the primary circuit between chamber 10 and chamber 18 takes place within a group of U-tubes 20, whose ends are fixed in tube plate 14, so as to respectively issue into chambers 10 and 18.

Conventionally, the ends of each of the tubes 20 are fixed in tube plate 14 both by means of a weld 22 (FIG. 6) located level with the lower face of plate 14 and by an at least partial expansion of that part of the tube located within plate 14. In the case of a partial expansion only, the expanded part is located in the vicinity of the upper face of tube plate 14.

In order to ensure that the stresses induced by expansion in the inner skin of the tubes does not lead to a cracking of the tubes under the effect of corrosion, according to the invention detensioning takes place to the expanded part of tube 20 using an installation designated in its entirety by the reference 26 in FIGS. 1 and 2.

This installation comprises one or more tools 28 (five in the represented embodiment), a toolholder subassembly 30 making it possible to introduce the tools 28 into the tubes, a control subassembly 32 ensuring the control of the movements of the tools and one or more flexible movement transmission assemblies 60 (five in the represented embodiment) connect each tool 28 to subassembly 32. Subassemblies 30 and 32 are carried by a supporting and positioning device 34 which moves on the lower surface of tube plate 14 being attached to the interior of the ends of the tube 20. Such a device, which is normally called a spider, is described and claimed in French patent No. 2 394 374 and does not form part of the present invention.

One of the tools 28 will now be described in greater detail relative to FIG. 3. In the latter, it can be seen that tool 28 comprises a cylindrical cage 36, in which is mounted in rotary manner a shaft 38, whose axis YY' is parallel to and displaced with respect to axis XX' of cage 36, which is itself parallel and displaced with respect to the axis ZZ' of tube 20 to be treated.

As illustrated by FIGS. 3 and 4, over its length cage 36 has at least one window 40 opening over approximately half the circumference of the cage, in the portion thereof closest to axis YY'.

As can be seen in section in FIG. 4, window 40 forms a quasi-circular section recess around shaft 38, the distance between said shaft and the bottom of the recess decreasing progressively in the rotation direction of shaft 38 indicated by arrow F1 in FIG. 4.

Figure 5:
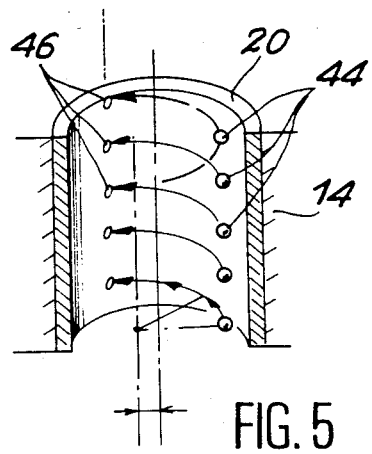
FIG. 5 a diagrammatic sectional view illustrating the principle of generating impacts by means of the tool shown in FIGS. 3 and 4.

Within each window 40, shaft 38 carries a flexible plate or brush 42, whose ends on the front face, considering the rotation direction F1 of shaft 38, carry at least one row of aligned balls or shot, made from tungsten carbide. The length of each brush half 42 exceeds the distance separating axis YY' from the inner wall of the tube. Thus, and as is diagrammatically illustrated in FIG. 5, whenever they leave the recess formed by window 40, shot 44 carried by brushes 42 strike against the inner wall of tube 20 in order to form an impression 46.

In non-limitative, exemplified manner, brushes 42 can be made from a plastic material. The shot 44, whereof the dimensions are such that they produce impacts with a diameter of approximately 100 microns, are then stuck to these plates.

To ensure that a shot accidentally detached from the brush does not jam between cage 36 and tube 20, the diameter of shot 44 is preferably less than the difference between the internal diameter of tube 20 and the external diameter of cage 36.

Preferably and as is more particularly illustrated in FIG. 4, brushes 42 are fixed to shaft 38 by introducing them into a slot 48 formed for this purpose in shaft 38. The actual fixing is brought about by means of a screw 50, whose head bears on one side of shaft 38 with respect to slot 48 and whose threaded end is screwed into a part 52, which slidingly receives the other side of shaft 38. This arrangement makes it possible to easily replace the brushes 42.

According to an interesting feature of the invention, shaft 38 is extended beyond the end of cylindrical cage 36 for the purpose of carrying a free brush 42', which is identical to brush 42, brush 42' being fixed to shaft 38 in the same way as brush 42.

In view of the fact that plate 42' is freely mounted on the end of shaft 38, the impacts of the shot 44' carried by it with the inner wall of tube 20 are less marked than the impacts of shot 44 against the same wall. This feature is advantageous when brush 42' peens the part of tube 20 immediately above tube plate 14. Thus, if the peening was carried out with an excessive force at this location, stresses might be induced in the outer skin of the tubes, which at this point are not secured in tube plate 14. The use of the free brush 42' consequently makes it possible to obviate this disadvantage. Moreover, it leads to slower wear of the said brush.

According to an interesting feature of the tool 28 shown in FIGS. 3 and 4, said tool is equipped with means making it possible to keep constant the distance separating axis YY' from the closest part of the inner wall of tube 20.

In FIGS. 3 and 4, it can be seen that these means comprise two elastic blocks 54 located in the same transverse plane and disposed substantially at 60° on either side of the plane passing through axes XX' and YY' on the side of cage 36 furthest from axis YY'. These blocks 54 are connected to the cylindrical cage 36 by spring plates 56 tending to radially apply them towards the outside against the inner wall of tube 20. Opposite to blocks 54, i.e. on the side of cage 36 closest to axis YY' in the plane passing through axes XX' and YY' on either side of window 40, cage 36 carries two rigid bearing blocks 58.

When tool 28 is placed in a tube 20, the elastic blocks 54 bear against the inner wall of the tube, so as to apply the bearing blocks 58 against the opposite part of said same wall, no matter what the internal diameter of the tube. Consequently the distance between axis YY' and that part of the inner wall of the tube closest to said axis and on which bear blocks 58 remains constant.

As a result of this feature, it is possible to ensure a uniform peening of the inner wall of the tubes, no matter what the diameter variations thereof.

As a function of the particular case, tool 28 may only have two flexible plates 42 and 42', as shown in FIG. 3, or can have a larger number of such plates. In the latter case and which more particularly applies with respect to the detensioning of tubes expanded over the entire thickness of the tube plate 14, tool 28 can be formed from several elementary modules articulated to one another by universal joints.

Preferably and as is also illustrated in FIG. 3, tool 28 is dismantleably mounted on the end of the flexible movement transmission assembly 60 connecting tool 28 to subassembly 32 ensuring the control of the movements (FIG. 1).

More specifically, in its part closest to tool 28, flexible assembly 60, starting from the center, comprises a flexible drive shaft 62, a flexible drive sleeve 64 within which can freely rotate cable 62 and a flexible pipe forming a rack 66 within which is mounted the flexible sleeve 64.

The rack-forming flexible pipe 66 is fixed by its end to a rack end piece 68, e.g. by welding. The end of the flexible sleeve 64 is also fixed in end piece 68, e.g. by means of screws 70. At its end adjacent to end piece 68, cage 36 carries an elastic tongue 72, whose end is located in a notch 74 formed in a ferrule 73 integral with end piece 68. Thus, tool 26 is dismantlably fitted to the end of the flexible assembly 60, cage 36 being integral in rotation and translation with sleeve 64 and pipe 66. A pressure on the end of tongue 72 makes it possible to free the tool.

In the represented embodiment, it should be noted that one of the bearing blocks 58 is carried by end piece 68.

Flexible cable 62 is extended in a recess formed within the end piece 68 and carries at its end an end piece 76 mounted in rotary manner in end piece 68, in the extension of tool shaft 38. End piece 76 is provided with a projection 76a, which penetrates a complimentary recess formed in the facing end of shaft 38, when tool 28 is mounted on the end of flexible assembly 60. Thus, the flexible shaft 62 is integral in rotation with tool shaft 38.

Figure 6:
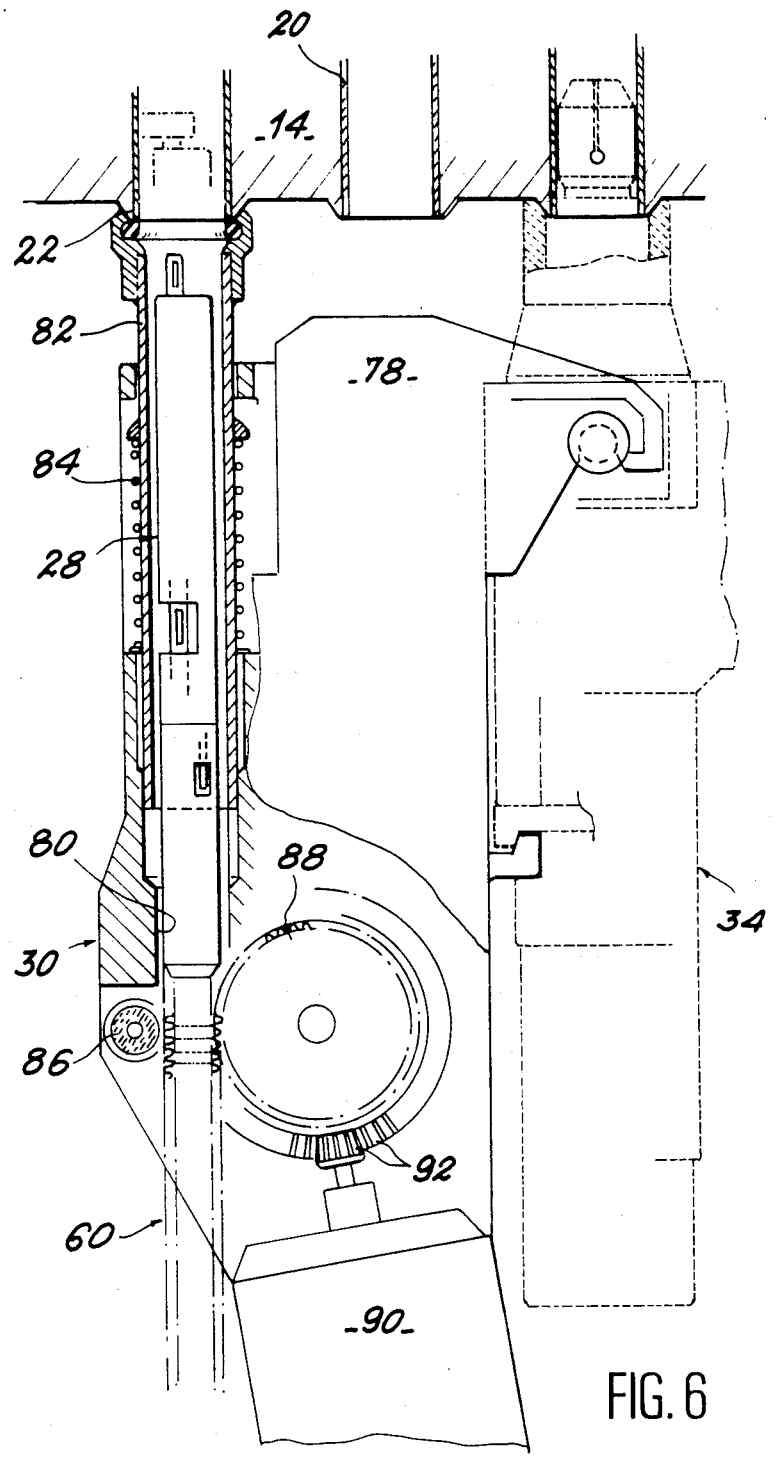
FIG. 6 a diagrammatic side view and in partial section showing a toolholder subassembly ensuring the introduction of the tools into the tubes in the installation according to the invention.

On referring to FIG. 6, it can be seen that the subassembly 30 used for introducing tool 28 into the tube 20 to be treated comprises a body 78, e.g. detachably fitted to spider 34. This body 78 has the same number of vertical passages 80 as the installation has tools 28. Each of these passages 80 is extended upwards by a guide sleeve 82, which can be tightly applied against the end of the corresponding tube 20 by a compression spring 84 bearing on body 78. The internal diameter of sleeves 82 is slightly smaller than the internal diameter of tubes 20.

When tools 28 are engaged within sleeves 82 (FIG. 6), the latter are disengaged from plate 14 by the vertical translation movement of the body of spider 34. The displacement of spider 34 carrying the installation according to the invention can then take place for the purpose of treating other tubes 20.

Below each of the passages 80 and on either side of the flexible assemblies 60, body 78 also supports an idler gear 86 and a driving gear 88, which mesh on opposite faces of the rack formed by each of the flexible pipes 66. Each of the driving gears 88 is rotated by a motor 90 acting on the corresponding gear 88 via bevel gears 92.

As a result of this arrangement the operation of motors 90 in one or other direction has the effect of introducing tools 28 into the tubes to be treated or, conversely, extracting the tools out of the tube. These two operations respectively precede and follow the actual treatment.

Figure 7:
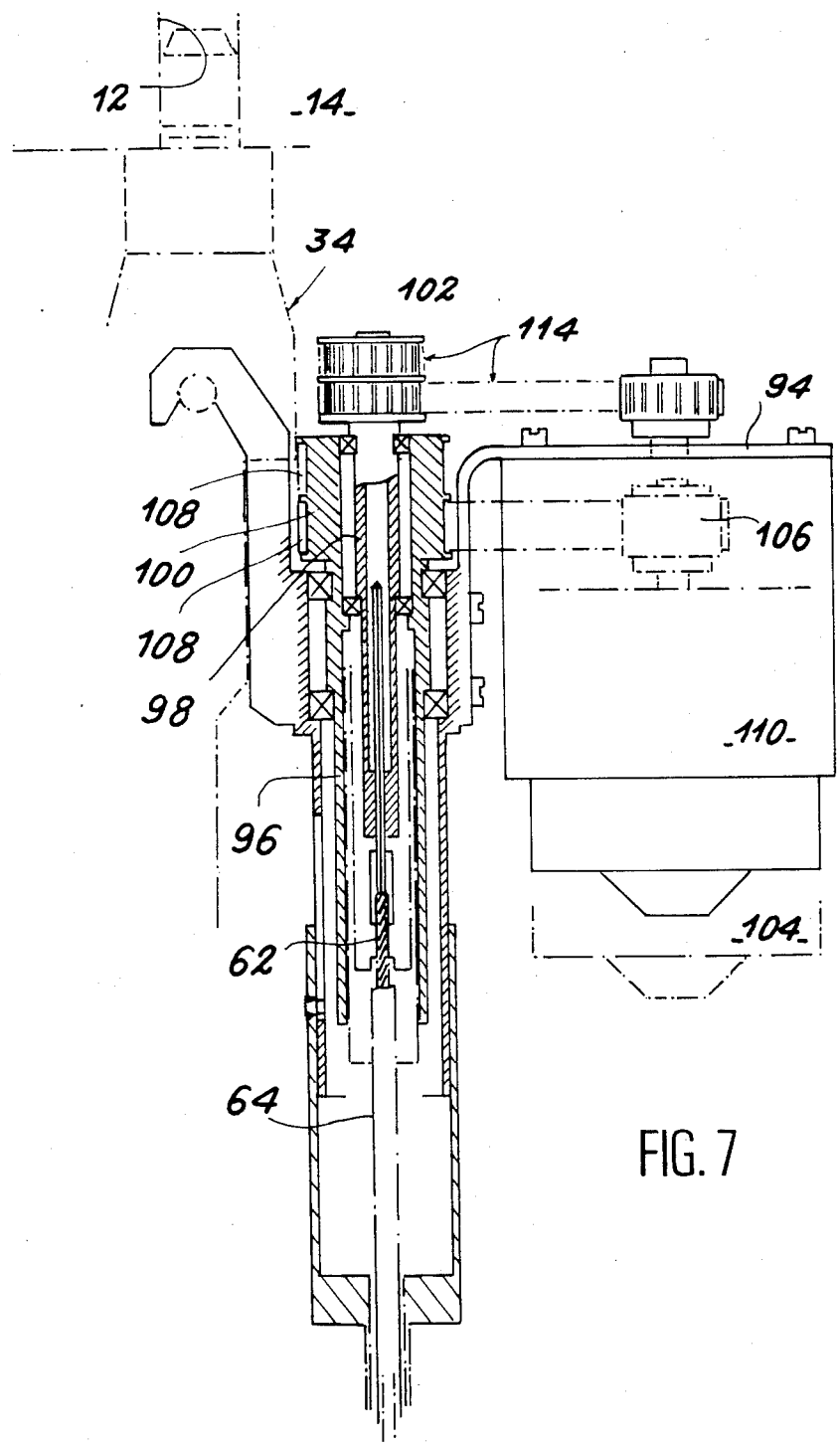
FIG. 7 a diagrammatic side and part sectional view showing the control subassembly ensuring the remote rotation of the shaft and the tool cage in the installation according to the invention.
Figure 8:
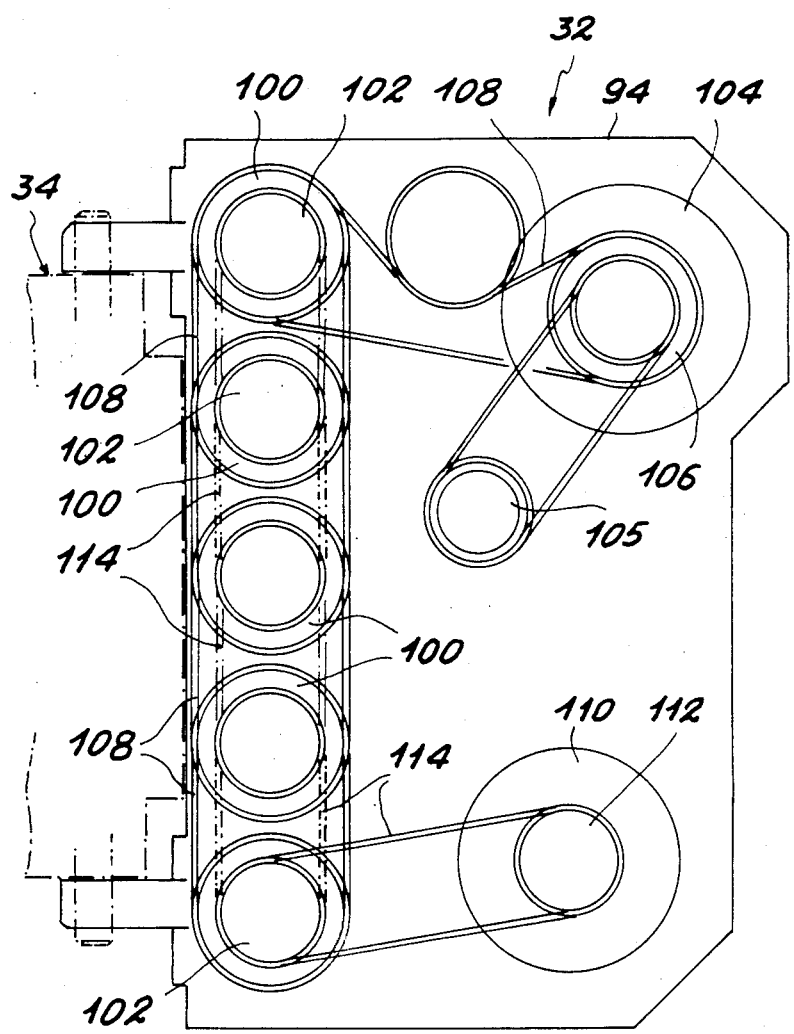
FIG. 8 a diagrammatic view from below of the subassembly of FIG. 7.

As is more specifically illustrated by FIGS. 7 and 8, the rotation of the flexible shafts 62 controlling the rotation of shafts 38 of each of the tools 28, as well as the rotation of the flexible sleeves 64 controlling, in a manner to be described hereinafter, the helical displacement of cage 36 of each of the tools within the tubes are effected as from subassembly 32.

Subassembly 32 comprises a body 94, e.g. detachably mounted on spider 34. Body 94 supports in rotary manner four vertical hollow shafts 96 within which are also received in rotary manner five shafts 98. The lower ends of each of the hollow shafts 96 are integral with the corresponding ends of flexible sheaths 64. In the same way, the lower ends of each of the shafts 98 are integral with the corresponding ends of flexible shafts 62.

A double notched pulley 100 is integral with the upper end of each of the hollow shafts 96. The upper end of each of the shafts 98 projects above said pulley 100 and is also integral with a double notched pulley 102.

The rotation of the hollow shafts 96 is controlled by an electric motor 104 of the torque motor type, carried by body 94 and whose vertical output shaft carries a notched pulley 106. A group of notched belts 108 ensures the transmission to the notched pulleys 102 of the rotary movement imparted to notched pulley 106 by motor 104. Thus, all the flexible sleeves 64 are simultaneously rotated at the same speed. For example, said rotation speed is between 7 and 20 r.p.m. The thus obtained rotation speed is preferably controlled by a tachogenerator 105, the number of revolutions being counted by a coder 107.

In a comparable manner, an electric motor 110, which is also of the torque motor type, is supported by body 94 and controls the rotation of a notched pulley 112, whose rotary movement is transmitted to the notched pulleys 104 by a group of notched belts 114. Thus, the group of flexible cables 62 is simultaneously rotated at the same speed, which is preferably between 2000 and 4500 r.p.m. This speed is also controlled by a not shown tachogenerator.

Figure 9:
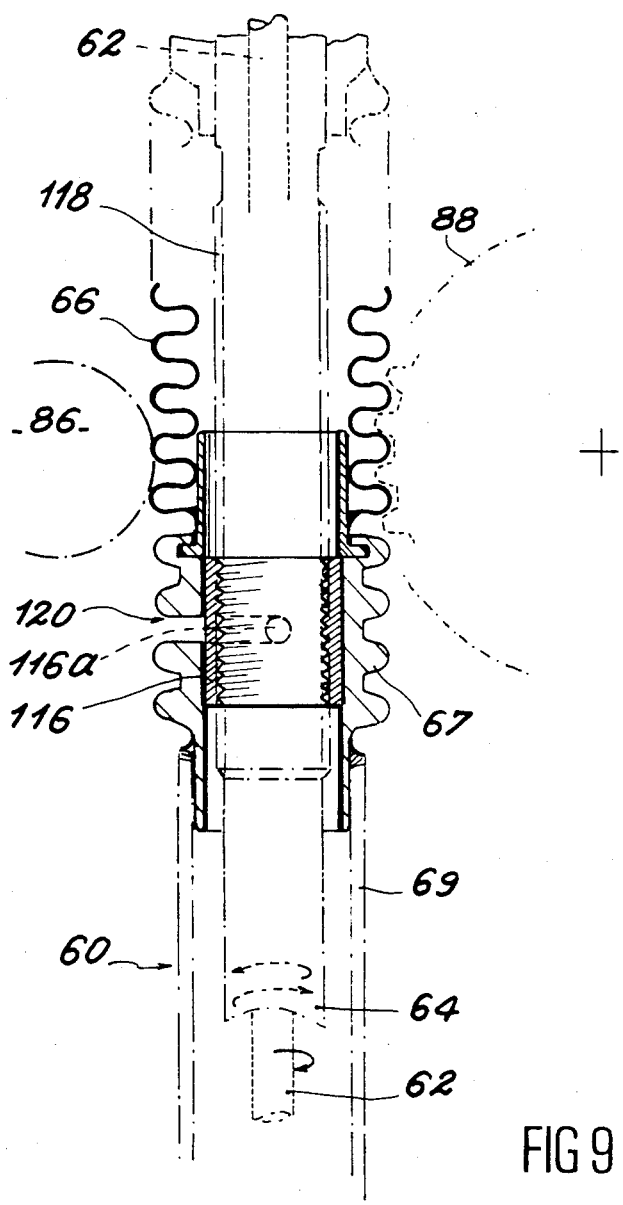
FIG. 9 a larger scale sectional view showing the means for producing the helical movement of the cage and for displacing by a half-pitch the return movement with respect to the outward movement.

To convert the rotary movement imparted to each of the flexible sleeves 64 into a helical forward movement of tool 28 within the tube to be treated, FIG. 9 shows that part of the flexible assembly 60 meshed on cog wheel 88 (FIG. 6) when the tool 28 is in the working position has a special structure.

More specifically, the flexible pipe 66 forming a rack is extended at this level by a sleeve 67, whose outer surface is indented with the same spacing as pipe 66. Sleeve 67 is interposed between the flexible pipe and a flexible pipe 69, whose opposite end is fixed to the body 94 of subassembly 32. Sleeve 67 is fixed, e.g. by welding, to the end of pipe 69, so that it is immobilized in rotation, whereas the indented pipe 66 rotates with sleeve 64.

A nut 116 is mounted in sleeve 67 and screwed to a threaded rod 118 integral at this point with the flexible sleeve 64. More specifically, nut 116 is mounted in sleeve 67, so as to be able to freely rotate by a half-revolution with respect to said sleeve and is then immobilized in rotation in sleeve 67. To this end, nut 116 carries on its outer face a pin 116a oriented radially towards the outside and penetrating a semicircular recess 120 formed in sleeve 67.

Sleeve 67 is immobilized in rotation by pipe 69 and immobilized in translation by the result of it meshing on pinion 88, when the tool is in the working position. The rotation of flexible sleeve 64 controlled by motor 104 of subassembly 32 consequently has the effect of screwing threaded part 118 in nut 116. The rotary movement imparted to sleeve 64 is consequently converted into a helical movement, whose pitch corresponds to the pitch of the helix of helical part 118 and nut 116. Thus, the putting into operation of motor 104 has the effect of moving cage 36 of each of the tool 28 along a helical path centered on axis ZZ' of the tube to be treated. As during this movement shaft 38 of each of the tools is also rotated by motor 110, this leads to a peening of the inner wall of the tubes with the aid of shot 44 along a helical path ensuring a perfectly regular distribution of the impacts.

When the helical outward path is ended, the rotation direction of motor 104 is reversed and consequently so is that of each of the flexible sleeves 64. During this movement reversal, pin 116, which was in abutment against one of the ends of recess 120 is rotated in the reverse direction and performs half a turn in order to abut against the other end of recess 120. During this half-turn, the cage of the tool also rotates by a half-turn without any axial displacement.

Figure 10:
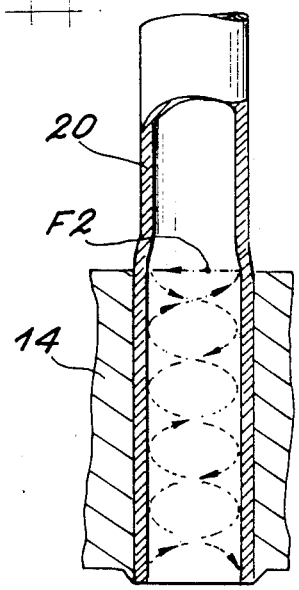
FIG. 10 diagrammatically the helical path taken by the tool within an expanded tube.

As a result of this feature, the return path of the tools 28 within the tubes takes place helically with an identical pitch, but displaced by a half-pitched with respect to the helix of the outward path. The path followed in this way by the tool within tube 20 to be treated is shown very diagrammatically by line F2 in FIG. 10, on which the helix has been deliberately greatly magnified.

As a result of this displacement by a half-pitch, the number of impacts is doubled and the impacts of the return path are equidistant of the impacts of the outward path.

Preferably and according to an advantageous feature of the invention, the pitch of the threads of the threaded part 118 and the nut 116, designated p, is determined as a function of the mean distance m separating two shots 44, 44′ on the flexible plates 42, 42′. This determination is effected in order to avoid any superimposing of the impacts of two separate shots, as would be the case when the ratio p/m was equal to 1, $\frac{1}{2}$, $\frac{1}{3}$, $\frac{2}{3}$, $\frac{1}{4}$ or $\frac{3}{4}$.

Figure 11:
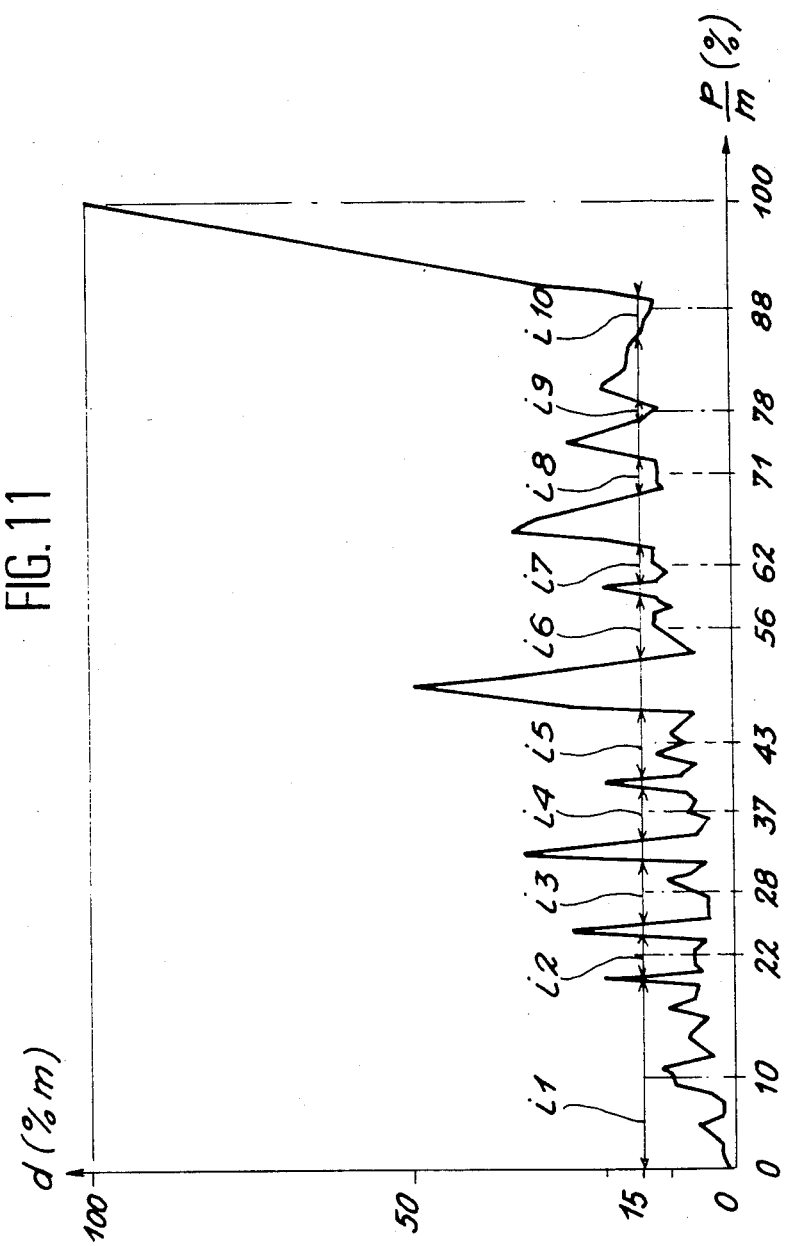
FIG. 11 a curve representing, as a percentage of m, the maximum distances d separating two impacts along the same generatrix of the tube, as a function of the ratio p/m, also expressed as a percent, p being the pitch of the helix traversed by the tool and m the mean distance separating two shots on the flexible plates of the tool.

FIG. 11 shows the variations of the maximum distance d between two impacts, along a generatrix of the tube and expressed as a percentage of the mean distance m, as a function of the ratio p/m, also expressed as a percentage. It can be seen that distance d is greatest when the ratio p/m has one of the values indicated in the preceding paragraph.

According to the invention, ratio p/m is given a value such that the maximum distance d is as small as possible, e.g. less than 15% of m. Thus, ratio p/m is placed in one of the ranges designated by references $i_1$ to $i_{10}$ in FIG. 11. More specifically, bearing in mind the fact that the real distance between the shots can have differences compared with the mean distance m, ratio p/m is given a value close to that corresponding to the center of these ranges, i.e. close to 10%, 22%, 28%, 37%, 43%, 56%, 62%, 71%, 78% or 88%.

Preferably, in order to ensure fast treatment, ratio p/m is given the maximum possible value. Moreover, every effort is made to ensure that the ratio p/m is not placed in a too narrow range $i_1$ to $i_{10}$, because the distance separating certain shots could be outside said range. Thus, ratio p/m is given a value located in the center of range $i_6$, i.e. close to 56%.

Obviously the invention is not limited to the embodiment described in exemplified manner hereinbefore and in fact covers all variants thereof.

In particular, it is clear that the subassemblies 30 and 32 can be mounted rigidly and directly on spider 34, or can be designed so as to be fixed to said spider when the latter is already in place.

It has also been seen that the length of the tool and the number of brushes supported by it vary as a function of the length of the tube to be treated. From this standpoint, it is pointed out that the treatment of an expanded tube over the entire thickness of the tube plate can take place by means of a long tool constituted by several elementary modules articulated to one another by universal joints. More specifically, each module can be constituted by a rigid cage element, terminated at its ends by universal elements and in which is located in rotary manner a rigid shaft element also terminated at its ends by universal elements. The universal joints connecting the shaft elements are then located in the universal joints connecting the cage elements. However, in order to take account of the displacement between the axes of the shaft and cage elements, the universal joints connecting the shaft elements have a certain radial clearance.

As a non-limitative example, each of the modules of such a long tool can be equipped with two brushes. The head or end module then comprises a free brush and a cage brush, whereas the other modules comprise two cage brushes. The different modules can be interconnected by dismantlable connections making it possible to adapt the tool length to the length of the tube to be treated.

In the case of such a long tool, it should be noted that means 88,90 making it possible to introduce and extract the tool with respect to the tube to be treated must necessarily be further away from the tube plate 14 than in the previously described embodiment. For this purpose, the toolholder subassembly 30 then comprises a first part carried by the spider and has tool guiding sleeves. The body of said first part is connected by tubes, located in the extension of the guide sleeves and into which can be retracted the tools, to bodies in which are mounted the introduction and extraction means constituted by motors 90 and the associated gears 86, 88 and 92. These tubes are rigidly fixed to the bodies of the first part and introduction and extraction means at their ends.

Finally, the installation can be designed for treating only one tube or several tubes simultaneously and in the latter case it has a number of tools.

What is claimed is:

1. An installation for detensioning of expanded tubes comprising a tool constituted by a cylindrical cage having a given axis, a shaft mounted in a rotary manner within said cage about a parallel axis and displaced with respect to the cage axis and at least one flexible plate fixed to said shaft facing an open window in part of the cage close to the shaft axis, said plate carrying at least one row of shot at is end, peening control means for rotating said shaft about its axis and sweeping control means for driving the cage in rotation and in translation within a tube to be treated and having an axis parallel to the axes of the cage and the shaft, wherein the seeping control means move the cage along a helical trajectory centered on the axis of the tube to be treated, the sweep control means comprising a threaded rod integral in rotation and translation with said cage, a nut mounted in a support member and which can be immobilized with respect to the tube, said nut being screwed onto the threaded rod, and rotation control means for rotating the threaded rod.

2. An installation according to claim 1, wherein said nut is mounted in the support member by means for displacing the helical trajectory by approximately a half-pitch, depending on whether the translation of the cage along its axis takes place in one or other direction.

3. An installation according to claim 2, wherein the means for displacing the helical trajectory by approximately a half-pitch comprise means for rotating the nut by approximately a half-turn in the support member during a reversal of the rotation direction of the rotation control means.

4. An installation according to claim 1, wherein it comprises a control subassembly carrying the peening control means and rotation control means, a toolholder subassembly supporting and introducing the tool into a tube to be treated, a flexible drive shaft connecting said peening control means to the shaft of the tool and a flexible drive sleeve surrounding the drive shaft connecting the rotation control means to the cage and incorporating the threaded rod.

5. An installation according to claim 4, wherein the tool-holder subassembly carries means for introducing and extracting the tool with respect to a tube to be treated, said latter means comprising a driving gear which meshes on an indented surface formed on said support member and on a flexible envelope placed around the flexible drive sleeve between said support member and the tool cage.

6. An installation according to claim 1, wherein the helical trajectory having a pitch p and the shots of the same series being separated by a mean distance m, the ratio p/m, expressed as a percentage, is close to one of the following values: 10, 22, 28, 37, 43, 56, 62, 71, 78 and 88.

7. An installation according to claim 6, wherein the ratio p/m, expressed as a percentage, is 56.

8. An installation according to claim 1, wherein the cage carries at least two elastic blocks able to bear within a tube for applying a generatrix of the cage closest to the axis of the shaft to the said tube.

9. An installation according to claim 1, wherein means for dismantling said tool from said peening control means and said sweeping control means are provided.

10. An installation according to claim 1, wherein the diameter of the shot is less than the difference between the internal diameter of the tube to be treated and the external diameter of the cage.

11. An installation according to claim 1, wherein the tool is formed from several modules, each incorporating a cage element and a shaft element, the cage elements and shaft elements of adjacent modules being connected by universal joints located within one another.

12. An installation for the detensioning of expanded tubes comprising a tool constituted by a cylindrical cage having a given axis, a shaft mounted in a rotary manner within said cage about a parallel axis and displaced with respect to the cage axis and at least one flexible plate fixed to said shaft facing an open window in part of the cage close to the shaft axis, said plate carrying at least one row of shot at its end, peening control means for rotating said shaft about its axis and sweeping control means for driving the cage in rotation and in translation within a tube to be treated and having an axis parallel to the axes of the cage and the shaft, wherein the sweeping control means move the cage along a helical trajectory centered on the axis of the tube to be treated, wherein the tool shaft has an extension beyond the end of the cage, said extension supporting a second flexible plate carrying shot at its end.

13. An installation for the detensioning of expanded tubes comprising a tool constituted by a cylindrical cage having a given axis, a shaft mounted in a rotary manner within said cage about a parallel axis and displaced with respect to the cage axis and at least one flexible plate fixed to said shaft facing an open window in part of the cage close to the shaft axis, said plate carrying at least one row of shot at its end, peening control means for rotating said shaft about its axis and sweeping control means for driving the cage in rotation and in translation within a tube to be treated and having an axis parallel to the axes of the cage and the shaft, wherein the sweeping control means move the cage along a helical trajectory centered n the axis of the tube to be treated, wherein each flexible plate is received in a slot formed in the tool shaft and is dismantlably fixed to said shaft by at least one screw traversing the plate and whose head bears on the shaft on one side of the plate and whose end is screwed into a part sliding in the shaft from the other side of the plate.

* * * * *

UNITED STATES PATENT AND TRADEMARK OFFICE
CERTIFICATE OF CORRECTION

PATENT NO. : 4,821,545

DATED : April 18, 1989

INVENTOR(S) : Philippe Druelle, Pierre Vidal, Robert Saglio, Jean-Louis Tocci

It is certified that error appears in the above-identified patent and that said Letters Patent is hereby corrected as shown below:

Column 2, line 26, delete "impact" and insert --impacts--.

Column 2, line 32, delete "impact" and insert --impacts--.

Column 4, line 9, delete "element" (second occurrence) and insert --elements--.

Column 5, line 11, delete "tube" and insert --tubes--.

Column 5, line 19, delete "tube" and insert --tubes--.

Column 10, line 42, after "for" insert --the--.

Column 10, line 53, delete "seeping" and insert --sweeping--.

Column 11, line 25, delete "series" and insert --row--.

Signed and Sealed this

Fifth Day of December, 1989

Attest:

JEFFREY M. SAMUELS

Attesting Officer     Acting Commissioner of Patents and Trademarks